(No Model.) 2 Sheets—Sheet 1.
A. L. HIGLEY.
CAR BRAKE AND STARTER.
No. 315,620. Patented Apr. 14, 1885.
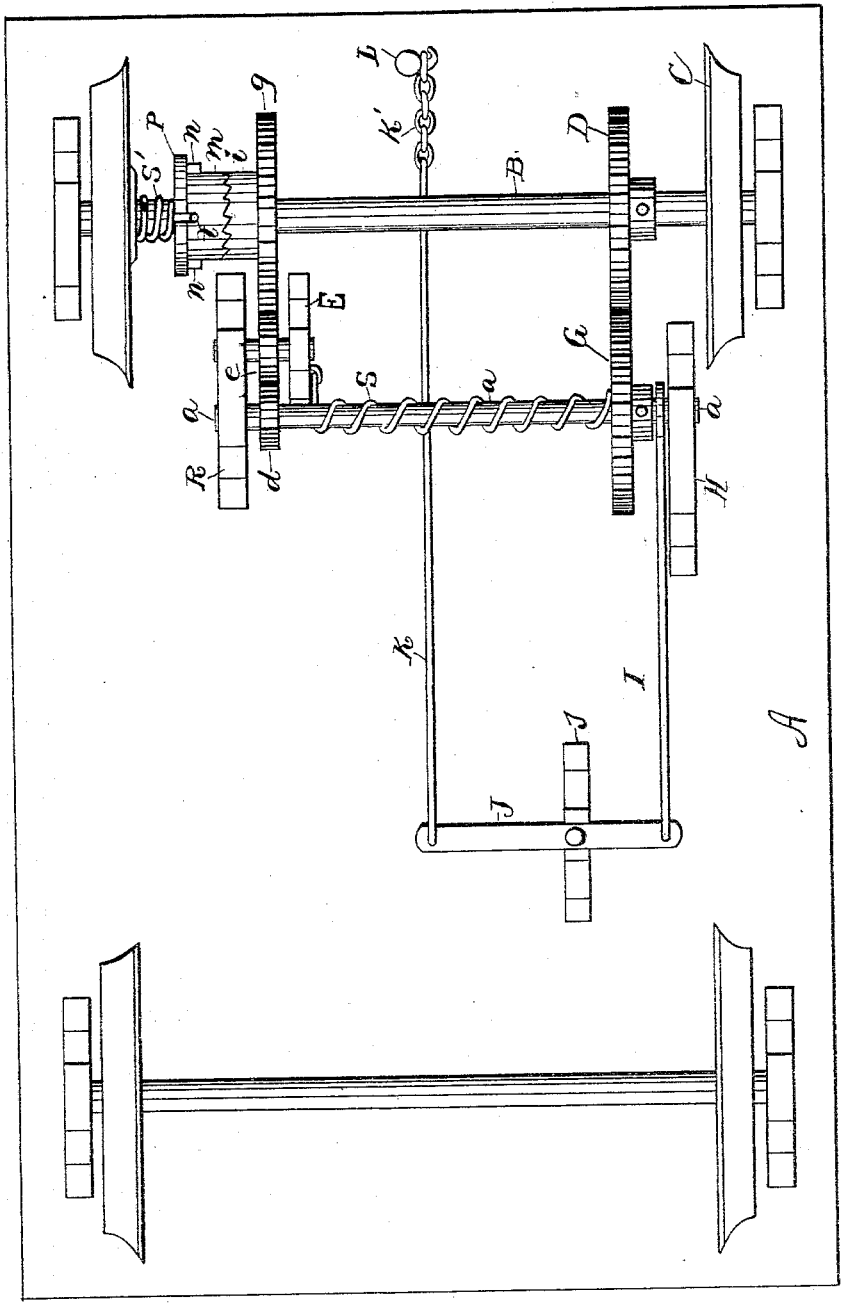
Witnesses:
Inventor.

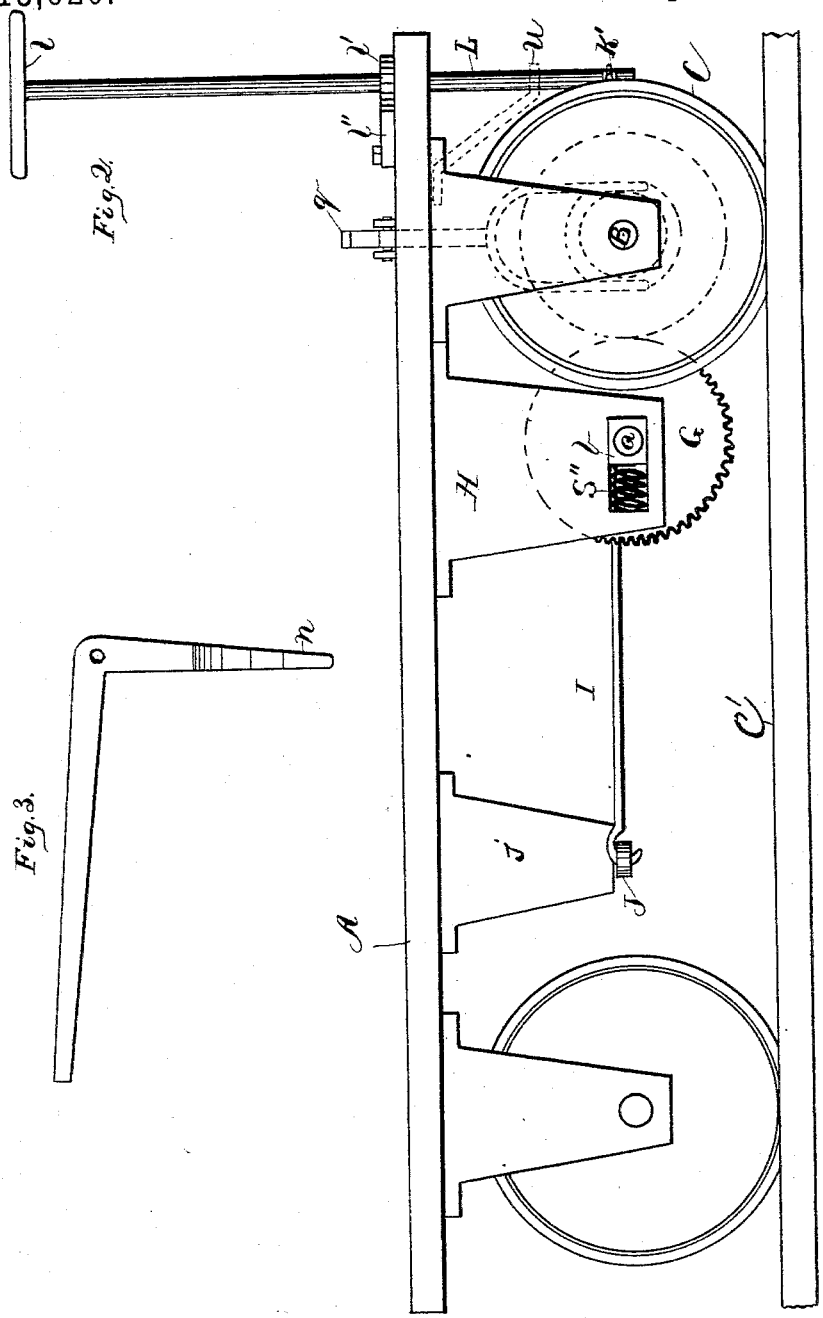

United States Patent Office.

ASA L. HIGLEY, OF TROY, NEW YORK, ASSIGNOR OF ONE-HALF TO HENRY J. McCHESNEY, OF SAME PLACE.

CAR BRAKE AND STARTER.

SPECIFICATION forming part of Letters Patent No. 315,620, dated April 14, 1885.

Application filed September 5, 1884. (No model.)

*To all whom it may concern:*

Be it known that I, ASA L. HIGLEY, a resident of the city of Troy, in the county of Rensselaer and State of New York, have invented certain new and useful Improvements in Car-Starters; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in car brakes and starters.

The object of my invention is to provide a spring-accumulator which will store up the power expended in stopping the car, and utilize it in starting the car again.

My invention consists in providing a spring-controlled shaft, one end of which revolves in a fixed position, while the other end is adapted to be moved back and forth toward and from a car-axle, and in providing the shaft and axle with suitable gear and ratchet wheels to turn the shaft against its spring when the car is stopped, and when the car starts to enable the force of the spring to assist in starting the same, as hereinafter more fully explained.

Figure 1 of the drawings is a plan view of the bottom of a car, showing my improved brake and starter. Fig. 2 is a side elevation of same. Fig. 3 is a side view of lever employed to throw the ratchet-wheels out of engagement with each other.

A is the bottom or frame of the car, to which are attached the bearings for the supporting-axles B, provided with flanged wheels for running on rails C'. The shaft a is provided at one end with a fixed bearing, R, and with the fixed gear-wheel d, and at the other end with a sliding bearing consisting of sliding box b, controlled by spring S' in the hanger H, and with fixed gear-wheel G. Shaft a is also provided with a coil-spring surrounding the same, one end of the spring being secured to the shaft or fixed wheel G and the other end to some external fixed object, as hanger E. The axle B is provided with the fixed track-wheels C, and with the fixed gear-wheel D, adapted to engage with gear-wheel G when they are forced together by spring S'', and with the loose gear-wheel g, adapted to engage at all times with the intermediate gear-wheel, e, the latter at all times engaging with the fixed wheel d on shaft a. The loose wheel is also provided with a ratchet-wheel, l', adapted to engage with a similar ratchet-wheel, m. The latter wheel m is loose upon the axle and free to slide longitudinally thereon; but is prevented from turning thereon by a pin, t, projecting from the axle B into a corresponding slot in the ratchet wheel or ferrule.

The spring S', between the ratchet m and a projecting boss on the car-wheel, tends to keep the two ratchet-wheels in engagement with each other.

The wheel or ferrule m is provided with a projecting ring, P, against which the prongs n of foot-lever q may be pressed to disengage the two ratchets and hold them in disengagement.

J is a lever fulcrumed upon a suitable support, j, and provided with a link, I, connecting directly with sliding box b, or with the shaft a, and with a link, K K', connecting with a suitable handle for operating the same, as upright L and wheel l, ratchet l', and pawl l''.

When a car is under headway, the wheels G D are kept apart by means of lever J and connecting-links I and K, held in position by pawl and ratchet l' l''. When it is desired to stop the car, the ratchet is released from its pawl, whereupon the spring S'' forces the sliding bearing b forward toward axle B and into engagement with gear-wheel D fixed thereon.

The engagement of wheels G and D imparts a revolving motion to shaft a against the torsional force of the spring S, which force tends to resist and check the revolution of axle B and onward movement of the car, and increases constantly until the axle and wheels C fixed thereon cease to revolve, in which case the car has stopped or is sliding upon the rails and very soon stops.

When it is desired to start the car again, the upright L is turned by its handle l until, through lever J and connecting-links, the gear-wheels G and D are disengaged, whereupon the whole force of the spring S is thrown upon the intermediate wheel, e, and through it upon the loose gear-wheel $g$, to revolve it in the same direction that axle B and wheels C revolve when the car is advancing. The two ratchet-wheels $i$ $m$ immediately engage and the car is forced forward. By having the wheel $d$ considerably smaller than the wheel $g$, as shown, very great power is exerted for a short distance to give the car a forward impulse. Such a result is particularly desirable in horse-cars, to which my improvements are especially applicable.

When it is desired to arrange the car to run in either direction, a similar device is attached to both ends of the car and both supporting-axles.

When the apparatus is not performing duty, the two ratchet-wheels $i$ $m$ may be easily disengaged from each other by means of the foot-lever $q$ or any equivalent device.

What I claim as new, and desire to secure by Letters Patent, is—

1. A spring-controlled swinging shaft, $a$, provided with fixed gear-wheels, one at or near each end, and means for swinging said shaft, as lever J and connecting-links I K, in combination with a car-supporting axle provided with a fixed gear-wheel adapted to engage with the gear-wheel on the swinging end of said shaft, and provided with a loose gear-wheel adapted to engage with an intermediate reversing-gear, the latter engaging with the gear on the fixed end of said shaft, said loose gear-wheel being provided with a ratchet-wheel adapted to engage with a similar spring-controlled ratchet-wheel adapted to slide longitudinally upon said axle, but fixed to revolve therewith, substantially as and for the purposes set forth.

2. A shaft provided with a spring adapted to rotate it in end bearings, one of said bearings being fixed and the other adapted to slide upon its support toward and from a car-axle, and provided with two fixed gear-wheels, in combination with means for operating said sliding bearing, as lever J and connecting links and handle, and a car-axle provided with a fixed gear-wheel adapted to engage with one of the gear-wheels on said shaft, and with a loose gear-wheel adapted to engage, through a reversing gear-wheel, with the other gear-wheel on said shaft, said loose wheel having a ratchet-wheel adapted to engage with a similar ratchet-wheel on the axle, adapted to slide on said axle to engage and disengage with the ratchet of the loose wheel, but fixed to revolve with the axle, substantially as and for the purposes set forth.

In testimony whereof I have hereunto set my hand this 2d day of September, 1884.

ASA L. HIGLEY.

Witnesses:
  GEO. A. MOSHER,
  W. H. HOLLISTER, Jr.